(12) United States Patent
Wisherd

(10) Patent No.: US 8,768,343 B2
(45) Date of Patent: Jul. 1, 2014

(54) WIRELESS LOCAL AREA NETWORK RECEIVER AND ASSOCIATED METHOD

(75) Inventor: David S. Wisherd, Carmel, CA (US)

(73) Assignee: Zebra Enterprise Solutions Corp, Oakland, CA (US)

( * ) Notice: Subject to any disclaimer, the term of this patent is extended or adjusted under 35 U.S.C. 154(b) by 1786 days.

(21) Appl. No.: 11/692,250

(22) Filed: Mar. 28, 2007

(65) Prior Publication Data

US 2007/0230424 A1 Oct. 4, 2007

Related U.S. Application Data

(60) Provisional application No. 60/787,885, filed on Mar. 31, 2006.

(51) Int. Cl.
*H04W 24/00* (2009.01)

(52) U.S. Cl.
USPC ....... 455/424; 455/68; 455/456.6; 455/550.1; 375/149; 375/343; 370/338

(58) Field of Classification Search
USPC .......... 455/424, 425, 561, 550.1, 575.1, 63.1, 455/67.11, 277.1, 67.13, 67.769, 68, 70, 455/418, 419, 456.1–456.6, 552.1; 375/149, 343, 224, 147; 370/47, 326, 370/338
See application file for complete search history.

(56) References Cited

U.S. PATENT DOCUMENTS

| | | | |
|---|---|---|---|
| 5,600,673 A * | 2/1997 | Kimura et al. | 375/224 |
| 5,621,412 A * | 4/1997 | Sharpe et al. | 340/10.33 |
| 5,651,030 A | 7/1997 | Wong et al. | 375/316 |
| 5,764,686 A * | 6/1998 | Sanderford et al. | 375/149 |
| 5,920,287 A | 7/1999 | Belcher et al. | 342/450 |
| 5,995,046 A | 11/1999 | Belcher et al. | 342/450 |
| 6,121,926 A | 9/2000 | Belcher et al. | 342/450 |
| 6,127,976 A | 10/2000 | Boyd et al. | 342/463 |
| 6,154,657 A * | 11/2000 | Grubeck et al. | 455/456.2 |
| 6,240,282 B1 * | 5/2001 | Kleider et al. | 455/226.1 |
| 6,380,894 B1 | 4/2002 | Boyd et al. | 452/450 |

(Continued)

FOREIGN PATENT DOCUMENTS

| | | | |
|---|---|---|---|
| CN | 1537395 A | 10/2004 | |
| WO | WO-92/20173 A1 | 11/1992 | |
| WO | WO-03/009613 A1 | 1/2003 | |
| WO | 2004/019559 | 4/2004 | H04L 12/28 |

OTHER PUBLICATIONS

Search Report for European Application No. 10010815.8, dated Nov. 10, 2010; 5 pages.

(Continued)

*Primary Examiner* — Nhan Le
(74) *Attorney, Agent, or Firm* — Alston & Bird LLP

(57) ABSTRACT

A wireless local area network (WLAN) includes a server and receiver, which includes a radio frequency (RF) front-end circuit that receives wireless signals from the mobile nodes within the WLAN and detects baseband signals. A signal waveform detector edge detects a signal waveform and generates a trigger signal indicative of the modulation type, data format and time-of-arrival (TOA) information of a desired signal to be captured. A baseband processor receives the trigger signal from the signal waveform detector and captures the desired signal. A system controller is connected to the baseband processor and configures the baseband processor for processing the desired signal and obtaining message data and signal metrics that are transferred to the system controller to be communicated outbound from the receiver as a client to the server.

29 Claims, 4 Drawing Sheets

(56) References Cited

U.S. PATENT DOCUMENTS

| | | | |
|---|---|---|---|
| 6,463,107 B1* | 10/2002 | Lindoff et al. | 375/343 |
| 6,593,885 B2 | 7/2003 | Wisherd et al. | 342/463 |
| 6,657,586 B2 | 12/2003 | Turner | 342/357.07 |
| 6,717,934 B1* | 4/2004 | Kaasila et al. | 370/347 |
| 6,853,687 B2 | 2/2005 | Harrington et al. | 375/259 |
| 6,892,054 B2 | 5/2005 | Belcher et al. | 455/63.1 |
| 6,987,744 B2 | 1/2006 | Harrington et al. | 370/328 |
| 7,046,657 B2 | 5/2006 | Harrington et al. | 370/350 |
| 7,139,583 B2 | 11/2006 | Yamasaki et al. | |
| 7,190,271 B2 | 3/2007 | Boyd | 340/572.4 |
| 7,218,274 B2* | 5/2007 | Arikan et al. | 342/195 |
| 7,386,063 B1* | 6/2008 | Husted | 375/316 |
| 2002/0015423 A1* | 2/2002 | Rakib et al. | 370/485 |
| 2002/0080759 A1* | 6/2002 | Harrington et al. | 370/338 |
| 2002/0181565 A1 | 12/2002 | Boyd et al. | 375/152 |
| 2002/0183020 A1* | 12/2002 | Zhu et al. | 455/108 |
| 2003/0017832 A1 | 1/2003 | Anderson et al. | |
| 2003/0185216 A1 | 10/2003 | Wende et al. | |
| 2004/0078151 A1 | 4/2004 | Aljadeff et al. | 702/40 |
| 2004/0137915 A1* | 7/2004 | Diener et al. | 455/456.1 |
| 2004/0157621 A1 | 8/2004 | Yamasaki et al. | 455/456.1 |
| 2005/0227661 A1 | 10/2005 | Ginzburg | |
| 2006/0095199 A1* | 5/2006 | Lagassey | 701/117 |
| 2006/0142041 A1* | 6/2006 | Tomasin et al. | 455/522 |
| 2006/0258371 A1* | 11/2006 | Krishnamurthi et al. | 455/456.1 |
| 2007/0103140 A1 | 5/2007 | Bernard | |
| 2007/0155306 A1 | 7/2007 | Koli et al. | |
| 2007/0184851 A1 | 8/2007 | Barnwell et al. | |
| 2007/0230424 A1 | 10/2007 | Wisherd | |
| 2007/0280182 A1* | 12/2007 | Wisherd et al. | 370/338 |
| 2008/0045236 A1* | 2/2008 | Nahon et al. | 455/456.1 |
| 2008/0130604 A1 | 6/2008 | Boyd | |
| 2008/0253314 A1* | 10/2008 | Stephenson et al. | 370/326 |
| 2012/0214414 A1 | 8/2012 | Abel et al. | |

OTHER PUBLICATIONS

International Search Report and Written Opinion for International Appl. No. PCT/US2010/047792, mailed Feb. 23, 2011.

Office Action for Chinese Application No. 201080049740.4; dated Nov. 4, 2013.

Office Action for U.S. Appl. No. 12/874,960; dated Dec. 23, 2013.

* cited by examiner

WIRELESS LOCAL AREA NETWORK RECEIVER AND ASSOCIATED METHOD

RELATED APPLICATION

This application is based upon prior filed copending provisional application Ser. No. 60/787,885 filed Mar. 31, 2006.

FIELD OF THE INVENTION

This invention relates to the field of wireless local area networks (WLAN's), and more particularly, this invention relates to real-time location systems and WLAN's.

BACKGROUND OF THE INVENTION

Wireless local area networks (WLAN) and real-time location systems (RTLS) are becoming more commonplace as the use of portable computers, such as "laptop," "notebook," and "pen" computers become increasingly common in office environments and other locations. Examples of real-time location systems and the circuitry and algorithms used in such real-time location systems are described in commonly assigned U.S. Pat. Nos. 5,920,287; 5,995,046; 6,121,926; and 6,127,976, the disclosures which are hereby incorporated by reference in their entirety. Examples of real-time location systems that are operative with wireless local area networks are disclosed in commonly assigned U.S. Pat. Nos. 6,892,054; 6,987,744; 7,046,657; and 7,190,271, the disclosures which are hereby incorporated by reference in their entirety.

It is desirable in some WLAN systems if a real-time location system can incorporate a receiver that connects to a network as a client, which is simple, and incorporates existing information technology (IT) communications systems, and could be used in conjunction with an access point or alone, and provide some ability to locate access points and communicate to a server.

SUMMARY OF THE INVENTION

A wireless local area network (WLAN) includes a server and receiver in communication with the server as a network client. The receiver includes a radio frequency (RF) front-end circuit that receives wireless signals from the mobile nodes within the WLAN and detects baseband signals. A signal waveform detector is connected to the RF front-end circuit for edge detecting a signal waveform and generating a trigger signal indicative of the modulation type, data format and time-of-arrival (TOA) information of a desired signal to be captured. A baseband processor is connected to the RE front-end circuit and the signal waveform detector and receives the trigger signal from the signal waveform detector and captures the desired signal. A system controller is connected to the baseband processor and configures the baseband processor for processing the desired signal and obtaining message data and signal metrics that are transferred to the system controller to be communicated outbound from the receiver to the server.

A media access control (MAC) device is connected between the system controller and server. A TOA processor is connected to the baseband processor and receives the TOA information and generates the time stamp for the desired signal. In this non-limiting example, the TOA processor can be operative for processing TOA information when the receiver is part of a geometric array of network nodes and determine first-to-arrive signals based on a common network timing signal and conduct differentiation of the first-to-arrive signals to locate a desired wireless node.

In yet another aspect, a wireless network connection exists between the server and the receiver. In still another aspect, a wired network connection exists between the server and the receiver.

It is possible to have diversity antennas connected to the RF front-end circuit and provide spatial diversity. The system controller can be operative for controlling RF signal selection to dual RF channels connected to the diversity antennas. A wireless access point is connected to the receiver. A multiplexer switch can be connected between the receiver and the wireless access point for selectively switching between the receiver and the wireless access point.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

In accordance with a non-limiting example of the present invention, a WLAN system includes a receiver that is connected to a network as a client. It is usable as a "soft" (modular and software upgradable) location processor system for different types of wireless signal formats and frequencies or combinations. It could be operative as a system for locating WLAN terminals and tag transmitter location, for example, operative with Wherenet ISO24730 devices.

Low complexity and simplicity of operation with existing information technology communications networks is provided. The receiver can be operative as an active antenna and can isolate the real-time location system (RTLS) layer from the network and allow upgrades for more flexibility. It can comply with existing and evolving network security processes by having the receiver operate as a client and not as an access point (AP). The receiver can lower the cost of a real-time location system detection in a physical layer. The receiver can be remotely set to modulation formats and frequencies that are completely independent of a host access point.

Figure 1:
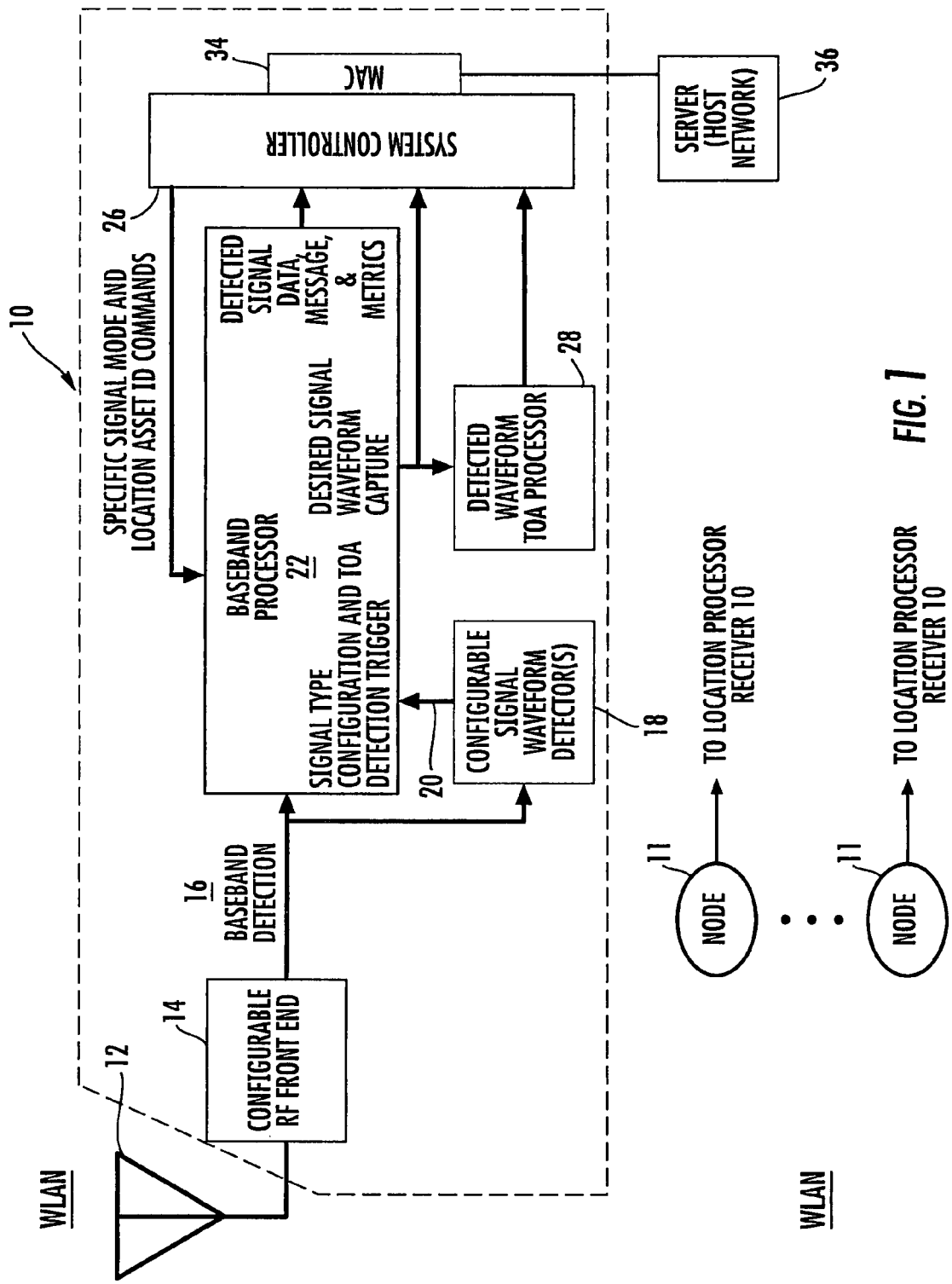
FIG. 1 is a block diagram of a WLAN system showing basic components of a WLAN receiver in accordance with a non-limiting example of the present invention.

A receiver for use in the illustrated WLAN system, in accordance with a non-limiting example of the present invention, is shown in FIG. 1 at 10. The RF antenna 12 can be a single frequency or multi-band antenna. Various other wireless nodes are illustrated as part of the WLAN. A configurable RF front-end circuit 14 can also be single frequency or multi-band for receiving multiple frequencies. The RF front-end circuit 14 is configured for baseband detection 16, which can be either a full or partial bandwidth to constrain the number of detected signals.

A configurable signal waveform detector 18 can be remotely set for initial edge detection of a desired signal waveform (or waveforms) to be processed. A trigger signal is generated at 20 to a baseband processor 22 for the desired signal and modulation type, data format and time-of-arrival (TOA) capture configurations. This trigger signal is generated for each desired signal to be captured. The baseband processor 22 is operative at a real-time configuration and detects the desired signal waveform and data. This baseband processor 22 can support multiple waveform types and the signal capture can be a priori to trigger generation. The waveform capture occurs in real-time during the trigger signal generation.

As illustrated, the detected signal waveform capture can either be sent to the system controller 26 for communication to a remote time-of-arrival (TOA) processor, or an on-board TOA processor 28 can produce a time stamp for arrival of the captured signal. The time-of-arrival information can be sent to the system controller 26. The message data and signal metrics can be sent to the system controller 26, which can manage both the real-time configuration of the receiver 10 and the data to be communicated outbound through the media access controller (MAC) device 34 to a server 36. The illustrated receiver 10 would include its own MAC address.

At the RF front-end 14, the signal waveform detector 18 and baseband processor 22 can be real-time preconfigured by the system controller, based on locally generated and remote system requirement-based instructions. The MAC device 34 directs data, as a client, through either a wired or wireless connection, to the host network.

It should be understood that the configurable signal waveform detector 18 can be formed as a number of detectors that are used for detecting a number of desired signal waveforms. The system controller can also feedback specific signal mode and location asset identifier (ID) commands to the baseband processor that works in conjunction with the TOA processor 28 for determining asset locations such as a wireless node 11.

Figure 2:
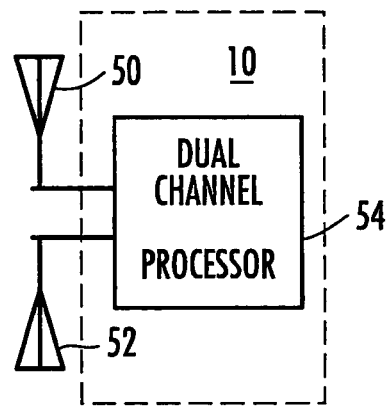
FIG. 2 is a block diagram of an example of a diversity antenna for the receiver in accordance with a non-limiting example of the present invention.

FIG. 2 shows two antennas 50,52 operative with the receiver 10, which could include a dual channel processor indicated at 54. Antenna special diversity is provided. The processor 54 can be incorporated into the RE front-end circuit 14 or part of the baseband processor 22. The two antennas 50,52 can be spaced apart to provide spatial diversity. The processor 54 can be configured with a common signal processor and RE signal strength based selection of two RF front-end channels. It is also possible to configure two completely separated detection channels that are controlled by the system controller.

Figure 3:
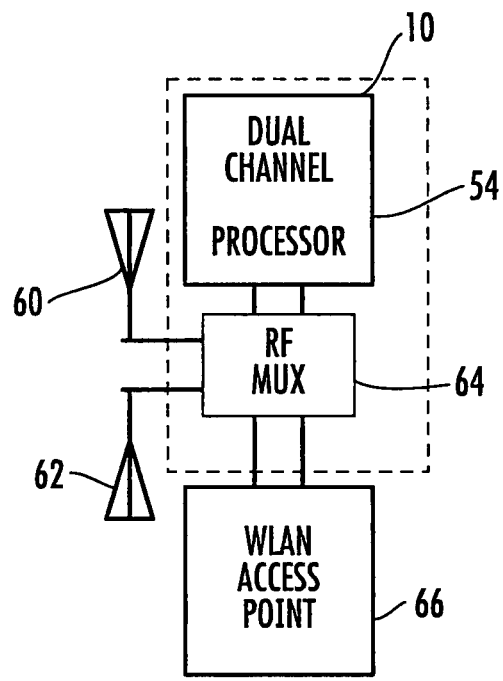
FIG. 3 is a block diagram of an active antenna for the receiver in accordance with another non-limiting example of the present invention.

As shown in FIG. 3, an active antenna system for a WLAN access point is illustrated. Two antennas 60,62 are illustrated and connected to a radio frequency multiplexer 64 operative as a switch that connects into the dual channel processor 54, which could be similar to the processor shown in FIG. 2, and a WLAN access point 66. The REF multiplex switch (MUX) 64 simultaneously receives RF signals for transmission to the receiver 10 and host WLAN access point 66 as selected. The switch 64 selects between the two "client" for RF transmission. This active antenna device can connect to the access point 66 as a replacement for its normal passive antenna and interfaces to a host access point as a wireless client. The circuit can include a preamplifier or RF line amplifier or other component for an active antenna circuit.

There are various advantages of the receiver 10 as described. These advantages include connectivity to an information communications network as a client of that network, either wireless or wired. The receiver 10 can be combined with an antenna as a location processor such as described in the incorporated by reference patents and connect as a network client. It is also possible to use the device either as a replacement for an external antenna of a wireless network access point (AP) or as an independently located client.

It is also possible to direct remotely the receiver as an element of a geometric array for locating an asset such as an RF tag or wireless network client. It is also possible to reconfigure remotely in real-time the receiver for a center RF receive frequency and RF and information bandwidth. The receiver 10 can detect a desired signal format and select a desired signal for detection and processing based on specific data in the detected signal packet and/or data format such as a client ID, asset category, packet length and similar details. The receiver can be operative as a system engine capable of detecting multiple modification formats and RF frequencies in the order of incoming reception and according to a remote preset, such as the priority of signal type and the frequency and the priority of signal ID.

For purposes of description, the type of location circuits, algorithm, and associated functions that can be modified for use with the present invention are set forth in the incorporated by reference patents. For purposes of description, FIGS. 4 and 5 describe representative examples of circuit architectures that can be modified for use, in accordance with non-limiting examples of the present invention, and used in the receiver 10 architecture associated therewith.

Figure 4:
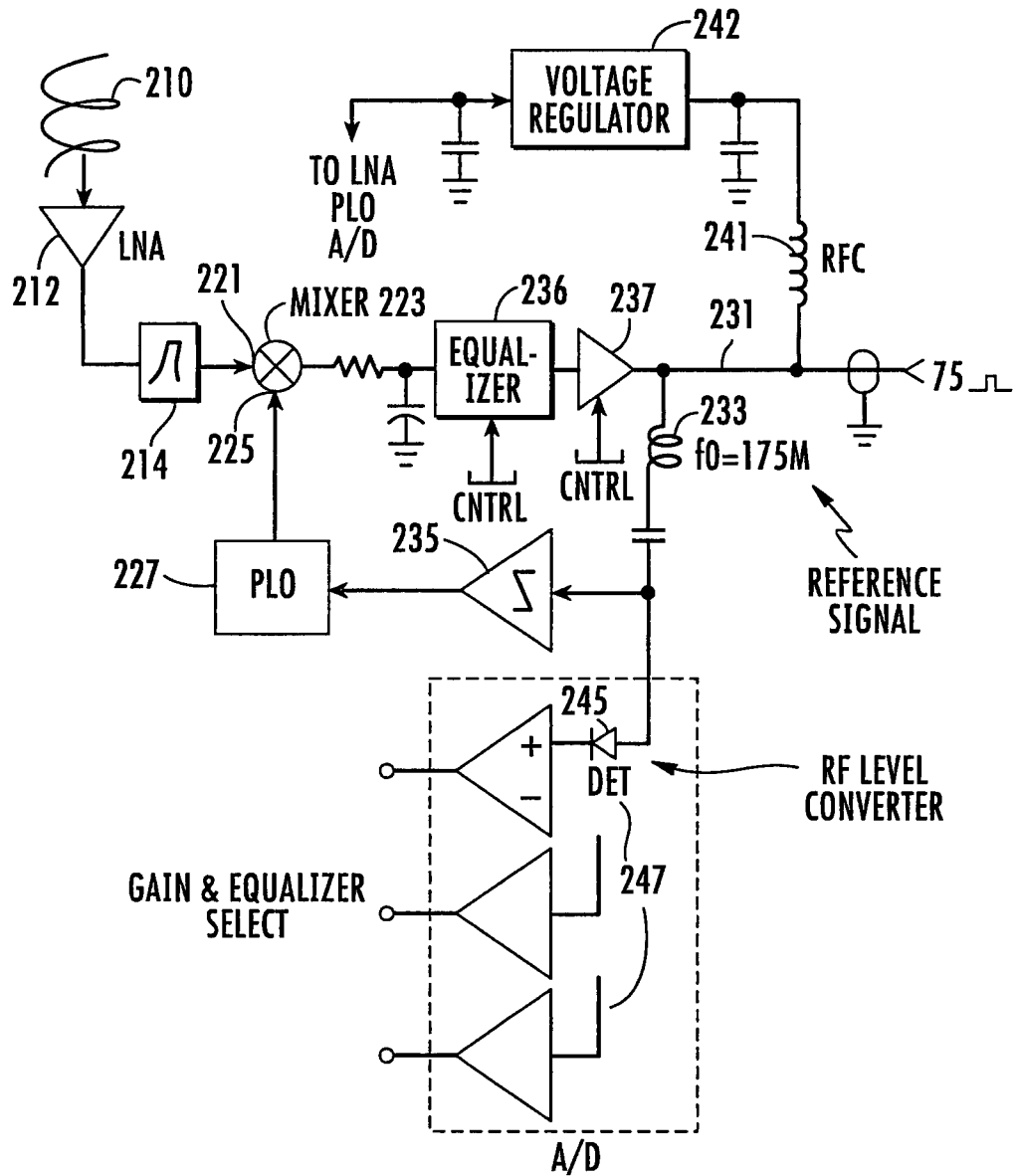
FIG. 4 is a high-level block diagram of one example of the circuit architecture that can be modified for use as part of a processor for determining first-to-arrive signals.

FIG. 4 diagrammatically illustrates one type of circuitry configuration of a respective location receiver (or "reader") architecture for "reading" location pulses or associated signals, "blink" as sometimes referred, such as emitted from a mobile station. An antenna 210 senses appended transmission bursts or other signals from a respective mobile station. The antenna, which could be omnidirectional and circularly polarized, is coupled to a power amplifier 212, whose output is filtered by a bandpass filter 214. Respective I and Q channels of the bandpass filtered signal are processed in associated circuits corresponding to that coupled downstream of filter 214. To simplify the drawing, only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communications cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output which is applied through a controlled current amplifier 237 and applied to communications cable 231 to a communications signal processor, which could be an associated processor 32,32a. The communications cable 231 also supplies DC power for the various components of the location receiver by way of an RF choke 241 to a voltage regulator 242, which supplies the requisite DC voltage for powering an oscillator, power amplifier and analog to-digital units of the receiver.

The amplitude of the (175 MHZ) reference frequency supplied by the communications control processor to the phase locked local oscillator 227 implies the length of any communications cable 231 (if used) between the processor and the receiver. This magnitude information can be used as control inputs to an equalizer 236 and current amplifier 237, so as to set gain and/or a desired value of equalization, which may be required to accommodate any length of a communication cable. For this purpose, the magnitude of the reference frequency may be detected by a simple diode detector 245 and applied to respective inputs of a set of gain and equalization comparators shown at 247. The outputs of comparators are quantized to set the gain and/or equalization parameters.

Figure 5:
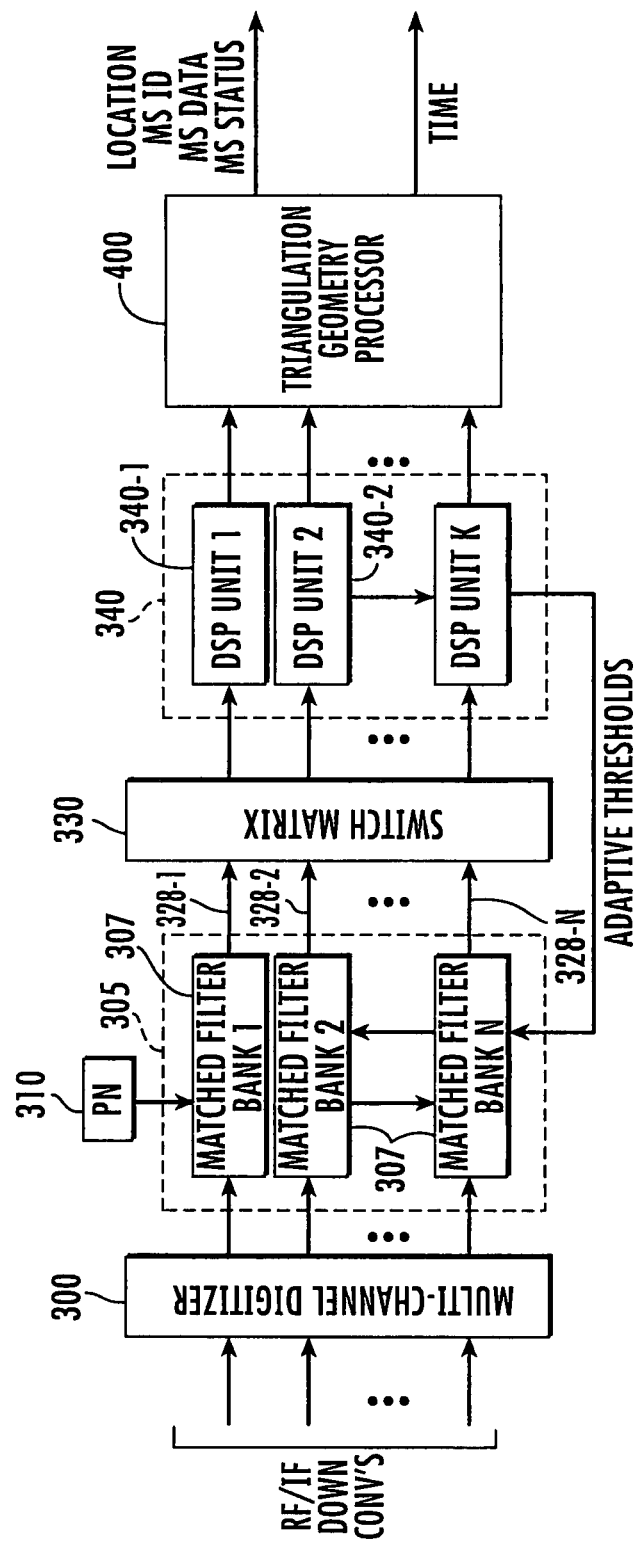
FIG. 5 is another high-level block diagram of an example of the circuit architecture that can be used as modified for correlation-based signal processors.

FIG. 5 illustrates the architecture of a correlation-based, RF signal processor as part of processor to which the output of a respective RF/IF conversion circuit of FIG. 4 can be coupled for processing the output and determining location. The correlation-based RF signal processor correlates spread spectrum signals detected by its associated receiver with successively delayed or offset in time (by a fraction of a chip) spread spectrum reference signal patterns, and determines which spread spectrum signal received by the receiver is the first-to-arrive corresponding to a "blink" or location pulse as part of the communications signal that has traveled over the closest observable path between a mobile station and a location receiver.

Because each receiver can be expected to receive multiple signals from the mobile station, due to multipath effects caused by the signal transmitted by the mobile station being reflected off various objects/surfaces between the mobile station and the receiver, the correlation scheme ensures identification of the first observable transmission, which is the only signal containing valid timing information from which a true determination can be made of the distance from the tag to the receiver.

For this purpose, as shown in FIG. 5, the RF processor employs a front-end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by a PN code generator is supplied to a first correlator unit and a series of delay units, outputs of which are coupled to respective ones of the remaining correlators. Each delay unit provides a delay equivalent to one-half a chip. Further details of the parallel correlation are disclosed in the '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of 'on-demand' or 'as needed' digital processing units 340-1, 340-2, . . . , 340-K. One of the correlator outputs 328 has a summation value exceeding the threshold, which delayed version of the PN spreading sequence is effectively aligned (to within half a chip time) with the incoming signal.

This signal is applied to a switching matrix 330, which is operative to couple a 'snapshot' of the data on the selected channel to a selected digital signal processing unit 340-*i* of the set of digital signal processing units 340. The mobile station can 'blink' or transmit location pulses randomly, and can be statistically quantified, and thus, the number of potential simultaneous signals over a processor revisit time could determine the number of such 'on-demand' digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

As a non-limiting example, the processor section 400 can use a standard multi-lateration algorithm that relies upon time-of-arrival inputs from at least three detectors to compute the location of the object. The algorithm may be one which uses a weighted average of the received signals. In addition to using the first observable signals to determine object location, the processor also can read any data read out of a mobile station's memory and superimposed on the transmission. Object position and parameter data can be downloaded to a database where object information is maintained. Any data stored in a mobile station memory may be augmented by altimetry data supplied from a relatively inexpensive, commercially available altimeter circuit. Further details of such circuit are disclosed in the '926 patent.

It is also possible to use an enhanced circuit as disclosed in the '926 patent to reduce multipath effects, by using dual antenna and providing spatial diversity-based mitigation of multipath signals. In such systems, the antennas of each location receiver are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the processor is modified to include a front-end subroutine that selects the earlier-to-arrive outputs of each of the detector pairs as the value to be employed in the multi-lateration algorithm. A plurality of auxiliary 'phased array' signal processing paths can be coupled to the antenna set (e.g., pair), in addition to the paths containing the directly connected receivers and their associated first arrival detector units that feed the triangulation processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively 'early' signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the 'pattern' or spatial distribution of gain to receive one incoming signal and ignore the other.

The multi-lateration algorithm executed by the processor could include a front-end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference U.S. Pat. No. 6,127,976. This architecture can be configured to distribute the workload over a plurality of interconnected information handling and processing subsystems. Distributing the processing load enables fault tolerance through dynamic reallocation.

The front-end processing subsystem can be partitioned into a plurality of detection processors, so that data processing operations are distributed among sets of detection processors. The partitioned detection processors can be coupled in turn through distributed association processors to multiple location processors. For maximum mobile station detection capability, each receiver is preferably equipped with a low cost omnidirectional antenna that provides hemispherical coverage within the monitored environment.

A detection processor filters received energy to determine the earliest time-of-arrival energy received for a transmission, and thereby minimize multi-path effects on the eventually determined location of a mobile device. The detection processor can demodulate and time stamp all received energy that is correlated to known spreading codes of the transmission, so as to associate a received location pulse with only one mobile station. It then assembles this information into a message packet and transmits the packet as a detection report over a communication framework to one of the partitioned set of association processors, and then de-allocates the detection report.

A detection processor to association control processor flow control mechanism can equitably distribute the computational load among the available association processors, while assuring that all receptions of a single location pulse transmission, whether they come from one or multiple detection processors, are directed to the same association processor.

The flow control mechanism can use an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile station (or device) to a single destination location processor, the association communication process of the communication framework may employ the same information and processing load distribution algorithm executed by the detection communication process of the communication framework. Each location processor determines the geographical location of a mobile station using the time-of-arrival measurement information originally sourced from the detection processors. The specific algorithm employed for location determination matches the number of arrival time measurements with whatever a priori information is available.

To locate a mobile station, a location processor may employ all available diversity information associated with the mobile station of interest, including, but not limited to the mobile station ID, any data contained in the transmission and metrics indicating confidence in these values. It then forwards a location report containing this information over a location communication process to an asset management database. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform the geolocation function of the present invention. The assumption is that the wireless communications signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is also possible to have a timing signal from a known location. Other component locations would have to be known, of course. For example, some wireless local area network (WLAN) transmitters have known locations to enable the use of the algorithm when an access point base station or mobile station location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improve accuracy by collecting more energy in the filter prior to leading edge detection.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless local area network (WLAN), comprising:
a server;
a receiver in communication with said server as a network client, and comprising,
a radio frequency (RF) front-end circuit configured to receive wireless signals;
a signal waveform detector connected to the RF front-end circuit and configured to detect one or more desired signal waveforms of the received wireless signal and, in response to detecting the one or more desired signal waveforms, generate a trigger signal indicative of a modulation type, a data format, and time-of-arrival (TOA) information; and
a processor connected to the RF front-end circuit and the signal waveform detector configured to receive the trigger signal from the signal waveform detector and captures the one or more desired signal waveforms.

2. The WLAN according to claim 1, further comprising:
a system controller connected to the processor that configures the processor for processing the one or more desired signal waveforms and obtaining message data and signal metrics that are transferred to the system controller to be communicated outbound from the receiver to the server; and
a media access control (MAC) device connected between said system controller and said server.

3. The WLAN according to claim 1, further comprising a TOA processor connected to said processor that receives the TOA information and generates a time stamp for the one or more desired signal waveforms.

4. The WLAN according to claim 3, wherein said TOA processor is operative for processing TOA information when said receiver is part of a geometric array of networked nodes and determining first-to-arrive signals based on a common network timing signal and conducting differentiation of the first-to-arrive signals to locate a desired wireless node.

5. The WLAN according to claim 1, further comprising a wireless network connection between said server and said receiver.

6. The WLAN according to claim 1, further comprising a wired network connection between said server and said receiver.

7. The WLAN according to claim 1, further comprising diversity antennas connected to the RF front-end circuit and providing spatial diversity.

8. The WLAN according to claim 7, further comprising a system controller connected to the processor that configures the processor for processing the one or more desired signal waveforms and obtaining message data and signal metrics that are transferred to the system controller to be communicated outbound from the receiver to the server, wherein said system controller is operative for controlling signal selection and RF signal based selection of dual RF channels connected to said diversity antenna.

9. The WLAN according to claim 1, further comprising a wireless access point connected to said receiver.

10. The WLAN according to claim 9, further comprising a multiplexer switch connected between said receiver and said wireless access point for selectively-switching signals between said receiver and said wireless access point.

11. The WLAN of claim 1, wherein the signal waveform detector is configured to detect the one or more desired waveforms within the wireless signals received by the RF front-end circuit, the wireless signals received by the RF front-end circuit including more than one signal waveform.

12. A receiver operative as a client in a wireless local area network (WLAN), comprising:
a radio frequency (RF) front-end circuit configured to receive wireless signals;
a signal waveform detector connected to the RF front-end circuit and configured to detect one or more desired waveforms of the received wireless signal and, in response to detecting the one or more desired signal waveforms, generate a trigger signal indicative of a modulation type, a data format, and time-of-arrival (TOA) information; and
a processor connected to the RF front-end circuit and the signal waveform detector configured to receive the trigger signal from the signal waveform detector and captures the one or more desired signal waveforms.

13. The receiver according to claim 12, further comprising:
a system controller connected to the processor that configures the processor for processing the one or more desired signal waveforms and obtaining message data and signal metrics that are transferred to the system controller to be communicated outbound from the receiver to a server; and
a media access control (MAC) device connected between said system controller and said server.

14. The receiver according to claim 12, further comprising a TOA processor connected to said processor that receives the TOA information and generates a time stamp for the one or more desired signal waveforms.

15. The receiver according to claim 14, wherein said TOA processor is operative for processing TOA information when said receiver is part of a geometric array of networked nodes and determining first-to-arrive signals based on a common network timing signal and conducting differentiation of the first-to-arrive signals to locate a desired wireless node.

16. The receiver according to claim 12, further comprising a wireless network connection between a server and said receiver.

17. The receiver according to claim 12, further comprising a wired network connection between a server and said receiver.

18. The receiver according to claim 12, further comprising diversity antennas connected to the RF front-end circuit and providing spatial diversity.

19. The receiver according to claim 18, further comprising a system controller connected to the processor that configures the processor for processing the one or more desired signal waveforms and obtaining message data and signal metrics that are transferred to the system controller to be communicated outbound from the receiver to a server, wherein said system controller is operative for controlling signal selection and RF signal based selection of dual RF channels.

20. The receiver according to claim 12, further comprising a wireless access point connected to said receiver.

21. The receiver according to claim 20, further comprising a multiplexer switch connected between said receiver and said wireless access point for selectively switching signals between said receiver and said wireless access point.

22. The receiver of claim 12, wherein the signal waveform detector is configured to detect the one or more desired waveforms within the wireless signals received by the RF front-end circuit, the wireless signals received by the RF front-end circuit including more than one signal waveform.

23. A method of communicating within a wireless local area network (WLAN), comprising,
- receiving, at a receiver, wireless signals;
- detecting one or more desired signal waveforms of the received wireless signal;
- in response to detecting a desired signal waveform, generating a trigger signal indicative of a modulation type, data format, and time-of-arrival (TOA) information;
- receiving the trigger signal and in response, capturing the one or more desired signal waveforms;
- processing the one or more desired signal waveforms to obtain message data and signal metrics; and
- transmitting the message data and signal metrics to a WLAN server.

24. The method according to claim 23, which further comprises transmitting the message data and signal metrics through a media access control (MAC) device connected between the receiver and a WLAN server.

25. The method according to claim 23, which further comprises receiving TOA information and generating a time stamp for the one or more desired signal waveforms.

26. The method according to claim 25, which further comprises processing TOA information and determining a first-to-arrive signal based on a common timing signal and conducting differentiation of the first-to-arrive signals to locate a desired wireless node.

27. The method according to claim 23, which further comprises controlling signal selection into dual RF channels based on RF signal detection.

28. The method according to claim 23, which further comprises transmitting the message data and signal metrics through a wireless access point operative with the receiver.

29. The method of claim 23, wherein the operation of detecting is performed by a signal waveform detector configured to detect the one or more desired waveforms within the received wireless signals, the received wireless signals including more than one signal waveform.

* * * * *